US011449948B2

(12) United States Patent
Ciaglia et al.

(10) Patent No.: US 11,449,948 B2
(45) Date of Patent: Sep. 20, 2022

(54) METHOD FOR SUBSCRIBING INSURANCE POLICIES FROM GEOLOCATED MOBILE DEVICES WITH CONTRACTING ON A DISTRIBUTED DATABASE

(71) Applicant: POLEECY INSURTECH S.R.L.S., Rome (IT)

(72) Inventors: Massimo Ciaglia, Mentana (IT); Elio Mungo, Rieti (IT)

(73) Assignee: POLEECY INSURTECH S.R.L.S., Rome (IT)

( * ) Notice: Subject to any disclaimer, the term of this patent is extended or adjusted under 35 U.S.C. 154(b) by 19 days.

(21) Appl. No.: 16/964,470

(22) PCT Filed: Jan. 16, 2019

(86) PCT No.: PCT/IB2019/050334
§ 371 (c)(1),
(2) Date: Jul. 23, 2020

(87) PCT Pub. No.: WO2019/145826
PCT Pub. Date: Aug. 1, 2019

(65) Prior Publication Data
US 2021/0049703 A1 Feb. 18, 2021

(30) Foreign Application Priority Data
Jan. 23, 2018 (IT) .................... 102018000001658

(51) Int. Cl.
*G06Q 40/08* (2012.01)
*G06F 16/27* (2019.01)
(Continued)

(52) U.S. Cl.
CPC ............ *G06Q 40/08* (2013.01); *G06F 16/27* (2019.01); *G06N 20/00* (2019.01); *G06Q 10/10* (2013.01);
(Continued)

(58) Field of Classification Search
USPC ...................................... 705/4, 35
See application file for complete search history.

(56) References Cited

U.S. PATENT DOCUMENTS

| 2011/0161100 A1 | 6/2011 | Peak et al. | |
| 2013/0066656 A1* | 3/2013 | Hanson | G06Q 40/08 705/4 |

(Continued)

FOREIGN PATENT DOCUMENTS

| AU | 2017101623 A4 | 1/2018 | |
| KR | 100546486 B1 * | 1/2006 | ............... H04Q 7/24 |
| TW | M547716 U | 8/2017 | |

OTHER PUBLICATIONS

International Preliminary Report on Patentability dated Aug. 6, 2020, from corresponding PCT application No. PCT/IB2019/050334.

(Continued)

*Primary Examiner* — William E Rankins
(74) *Attorney, Agent, or Firm* — Nixon & Vanderhye (57) ABSTRACT

A system for subscribing insurance policies from geolocated mobile devices, that uses geolocation to allow customers to select a suitable policy and finalize a purchase thereof, the system enabling selection of a policy from a plurality of policies categorized or automatically suggested according to user preferences, reservation of special contractual conditions, entering of necessary documents from a mobile device, and purchasing of policies online from the mobile device, the system including a mobile application that operates on the mobile device and a central infrastructure that includes user and insurance policy databases, a policy-position element generator, and a generator of insurance proposals, based on machine learning algorithms.

14 Claims, 3 Drawing Sheets

(51) Int. Cl.

| | | |
|---|---|---|
| *G06N 20/00* | (2019.01) | |
| *G06Q 20/32* | (2012.01) | |
| *G06Q 10/10* | (2012.01) | |
| *G06Q 20/06* | (2012.01) | |
| *G06Q 20/10* | (2012.01) | |
| *G06Q 20/12* | (2012.01) | |
| *G06Q 20/22* | (2012.01) | |
| *G06Q 20/34* | (2012.01) | |
| *G06Q 20/40* | (2012.01) | |
| *G06Q 30/00* | (2012.01) | |
| *G06Q 30/02* | (2012.01) | |
| *G06Q 40/02* | (2012.01) | |
| *G06Q 50/00* | (2012.01) | |
| *G06Q 50/18* | (2012.01) | |
| *G06Q 50/26* | (2012.01) | |
| *H04L 9/40* | (2022.01) | |
| *H04N 7/14* | (2006.01) | |

(52) U.S. Cl.
CPC ....... *G06Q 20/0655* (2013.01); *G06Q 20/108* (2013.01); *G06Q 20/127* (2013.01); *G06Q 20/227* (2013.01); *G06Q 20/322* (2013.01); *G06Q 20/3267* (2020.05); *G06Q 20/3278* (2013.01); *G06Q 20/341* (2013.01); *G06Q 20/401* (2013.01); *G06Q 30/016* (2013.01); *G06Q 30/0185* (2013.01); *G06Q 30/0201* (2013.01); *G06Q 30/0205* (2013.01); *G06Q 30/0252* (2013.01); *G06Q 40/02* (2013.01); *G06Q 50/01* (2013.01); *G06Q 50/18* (2013.01); *G06Q 50/265* (2013.01); *G06Q 2220/00* (2013.01); *H04L 63/04* (2013.01); *H04N 7/141* (2013.01)

(56) References Cited

U.S. PATENT DOCUMENTS

| | | | |
|---|---|---|---|
| 2013/0290036 A1* | 10/2013 | Strange | G06K 9/3275 |
| | | | 705/4 |
| 2016/0180468 A1* | 6/2016 | Buss | G06K 9/00691 |
| | | | 705/4 |
| 2016/0203561 A1* | 7/2016 | Peterson, IV | G06Q 40/08 |
| | | | 705/4 |
| 2017/0220998 A1 | 8/2017 | Horn et al. | |
| 2018/0025434 A1* | 1/2018 | Hertz | G06Q 40/08 |
| | | | 705/4 |

OTHER PUBLICATIONS

International Search Report of the ISA for PCT/IB2019/050334 dated Jan. 16, 2019, 2 pages.
Written Opinion of the ISA for PCT/IB2019/050334 dated Jan. 16, 2019, 10 pages.

* cited by examiner

METHOD FOR SUBSCRIBING INSURANCE POLICIES FROM GEOLOCATED MOBILE DEVICES WITH CONTRACTING ON A DISTRIBUTED DATABASE

FIELD OF THE INVENTION

The present invention relates to the field of sale and subscription of insurance policies. In particular, the proposed invention relates to a method of rapid subscription of insurance policies based on geolocated portable electronic devices which communicate with a back-end infrastructure capable of ensuring the inalterability of the stipulated contract and of offering advanced services to the customer.

PRIOR ART

At present, a plurality of software applications for the sale and subscription of online insurance policies are currently known. The subscription of policies with applications, often also available for mobile platforms such as smartphones and tablets, makes the subscription process much quicker and cheaper, eliminating on the one hand the need to physically go to an insurance branch and allowing, on the other hand, to convey the offer to the customer in an immediate and always up-to-date manner. The growing interest aroused recently by distributed ledgers, due in particular to the success of online trading systems, has led to the development of digital platforms that allow secure transactions directly online without the need for a central body to act as guarantor. The ability to activate insurance directly with one's own mobile device implies the undisputed advantage of being able to select, if necessary and depending on the context in which one is located, the most convenient and suitable insurance formula, including the so-called micropolicies, i.e. contracts with a well-defined and limited scope and value. There is also the possibility of making the payment using a plethora of methods ranging from telephone credit to credit cards, to cryptocurrencies. However, current systems do not fully exploit the potential of the digital tool, nor the capabilities offered by the now very common and ubiquitous smartphones. A first element of interest is the lack of a system that uses information from mobile devices, such as geo-referencing, to associate the user's location with specific events, places, public and commercial businesses, activities in progress, in order to draw up, in an autonomous and targeted manner, insurance offers from several companies operating in the area and offer them in real time to the potential customer. A further gap in this regard is the lack of anti-fraud measures that exploit this information, which may include, on request, the sending of photos or videos made directly from the device, as well as the automatic and timely transmission of the position during the policy coverage period.

Secondly, there is a lack of a secure method of contracting that guarantees, in the absence of the usual paper support, certainly out of place in an online policy subscription system, on the one hand the total inalterability of the contract terms and the other hand the possibility of offering dynamic and instant contractual variations without having to request additional authorizations and guarantees.

Finally, to date, one of the problems most felt by the user concerns the protection of privacy of personal data, which are inevitably shared with any insurance company.

In the international context, various inventions that deal with the problems in question are available. The Australian patent AU2017101623, for example, relates to a system of intelligent contracts based on chains of blocks, while the Taiwanese patent TWM547716 proposes an integrated system for the management of insurance practices, however it is clear that these solutions only partially address the aforementioned critical issues.

DESCRIPTION OF THE INVENTION

According to the present invention, a method and a system for subscribing insurance policies are implemented which effectively solve the problems outlined above, by using a software application specially developed for portable electronic devices—such as smartphones, tablets and PDAs—provided with geolocation, which allows consultation, selection, purchase and registration of insurance policies in a simple, fast and secure manner The proposed method uses a front-end, consisting of the aforementioned mobile application, and a back-end, consisting of a central processing system that hosts and provides a series of cooperating services aimed at purchasing policies and allowing connection to digital distributed ledgers for the secure storage of contracts.

Advantageously, the potential offered by mobile devices, such as geolocation, the ability to take photos and record videos, the presence of recognition hardware (fingerprint readers, facial recognition), connection to Wi-Fi networks and mobile data networks, are exploited to allow the customer to make an informed choice and finalize the purchase in a simple and short time. In particular, geo-referencing is used by the back-end to identify, by means of semantic search algorithms and artificial intelligence, the policies most suited to the user's needs, which include—possibly—special offers or very convenient service conditions based on the place and context. The system, in fact, uses data from the mobile device and information that the user has authorized to release to feed an offer generation engine which, starting from the policies available—through partnership, affiliation or online availability—and crossing the data through proprietary algorithms, offers directly on the device and in real time the most suitable contractual conditions. Thus, for example, a user who is in a tourist location can, conveniently and quickly, browse, without distractions and loss of time, the specialized companies offering accident prevention insurance, or insurance policies for inconveniences such as unavailability of hotel rooms, overbooking, rental of sports equipment, etc.

The potential of the digital medium will also be exploited to provide information that traditionally must be submitted by hand or delivered in person, such as identification documents and signatures. The system uses the hardware available on the electronic device to guarantee the authenticity and non-falsifiability of information by means of: fingerprint readers, retinal scan, georeferenced digitization of documents, digital signatures validated by certification authorities, electronic tag reading with NFC.

The system guarantees the protection of the user's personal data using cryptography and hashing algorithms—the user data will in fact be validated only once by the back-end server and propagated in the form of hash—so that the third parties—like the insurance companies, can verify at any time the authenticity of the information for the purposes envisaged by the policies, without necessarily having access to the data in clear. This model allows, advantageously, keeping the strictest confidentiality on very sensitive data, such as health data, without limiting the usability of the service. In the case of health insurances, for example, the insured person's information can be made accessible only to the doctor requesting health treatment and the insurance company will receive a token (digital token) proving the outcome of the visit and the request to proceed to the payment or refund. The mobile application will also allow, conveniently, the electronic purchase of the policy, advantageously offering to select from different payment options: telephone credit, credit and debit cards, bank transfers, forms, digital currency and cryptocurrency (association of digital currency portfolio). A setting activatable via software will enable the automatic charging of premium installments. Also for the payment data, the system guarantees the privacy and the inviolability of the data.

Likewise, the proposed method will allow the development of mechanisms to combat insurance fraud based on geolocation and on photographic evidence to be provided upon collection of the liquidation, contributing significantly to the reduction of a phenomenon that has always afflicted the insurance sector. The system, allowing the user to request compensation in real time, will use the mobile application for:

confirm the presence of the individual in the declared place, through geolocation, in the case of policies against accidents in specific places;
allow the sending of photographic and geo-referenced photographic evidence to be used as evidence in case of opposition;
start video calls with operators or with personnel in charge of surveying, in order to allow real-time certification of the damage and the context.

The back-end component will always be reachable through an IP network on a protected and encrypted channel and, depending on the size of the infrastructure and the expected traffic volume, it will be capable of implementing one or more servers, possibly using load balancers to address the requests, avoiding queues and waiting for users. The system, using this infrastructure, will overcome the traditional paradigm of management through intermediaries—both physical and virtual—such as web portals, by introducing two innovative tools in the field of the sale of policies:

the use of artificial intelligence algorithms for customer profiling and the drafting of targeted offers starting from the customer's current preferences and needs, obtained by processing both the mobile application usage data and one or more social media crawling services;
the adoption of a model based on distributed and encrypted blockchain databases, resistant to tampering and able to guarantee a very high level of reliability for the registration of contracts and conditions reserved for individual customers.

The proposed system furthermore conveniently provides, on the basis of the last point, the use of smart contracts, that is, a type of commercial agreement between the supplier and the end user which will not necessarily be bound by pre-defined terms and conditions pre-approved at the time of subscription, but can be modified and rewritten to make the offer more suitable to the needs of the buyer.

The back-end, finally, will use the potential of the Internet of Things to derive information not immediately obtainable through the mobile application installed on the device (400) of the customer, but that can be traced back to it by geolocation, such as for example operating status of insured vehicles, damage assessment, average cruising speed and insured driver driving habits;
conditions of the structures and premises frequented by customers, if provided with home automation devices (smoke detectors, air quality, energy consumption, etc.);
rating of service providers used for repairs and compensation.

The two components (front-end and back-end) of the proposed system will be described below.

As mentioned, the front-end consists of an application for mobile devices provided with geolocation, which will be implemented via satellite detection (GPS, GLONASS, Galileo, etc.), telephone cells and WiFP (WiFi Positioning System). The application, which will constantly communicate with the services offered by the back-end, will exhibit a simple and essential user interface, characterized by extreme navigability and ease. Two modes of use are conveniently contemplated: a search mode and an automatic proposal mode.

In the search mode, one can scroll through the list of suppliers, insurance companies, by category or geographical proximity, then select an insurance company to view the offers thereof. For each choice, the software will open a new screen with increasingly detailed information, up to the description of the policy, with costs, duration, terms and conditions, which may vary and be customized in real time based on the habits and profile of the user.

The user can then decide whether to purchase the policy and the payment method, while the application will manage the transaction autonomously, verifying at the same time the success of the payment and returning an error in the negative case. Once the payment has been verified and confirmed, the system will insert the contract into a distributed digital ledger that uses blockchain technology to guarantee the inalterability of the data. The policy will therefore be active immediately according to the accepted conditions of sale.

In the automatic proposal mode, the application will contact the back-end infrastructure, communicating the user's location, and will receive a list of policy proposals determined, advantageously, automatically by the artificial intelligence algorithms based on:

position of the device;
customer profile and habits;
purchase preferences;
events in progress in the area;
available facilities;
social media crawling;
semantic search on the web;
insurance companies operating in the area.

The proposals will be presented to the user in real time and constantly updated. Once a selection has been made, it will proceed in a manner similar to the search method described above.

Irrespective of the mode used, the front-end module will trace the user's choices and actions, sending them to the back-end in order to enrich the profile thereof and allow an ever more accurate selection of policy proposals.

The application is also provided with a configuration area in which the user can manage both their own profile and the preferences related to the application (such as the default use mode). From the configuration area, it will be possible to register to the service, entering the data necessary for the stipulation of policies such as, for example:

identification document (digital or scanned and validated);
property documents (real estate, vehicles, equipment, luxury goods);
medical-health certifications;

payment methods.

The data entered, in consideration of their sensitivity, after validation will be stored only on the device and encrypted. The use of the information for the stipulation of contracts will take place by sending a hash of the requested data or generating tokens corresponding to the information package.

The back-end of the system, consisting of the central infrastructure and the distributed services, will be conveniently accessible from all the devices that run the mobile application and will provide a series of features to implement the electronic subscription method illustrated above. The backend will include, advantageously:

- a user database with profiles, preferences, habits and purchase history. The database will be fed primarily with the mobile application usage information and information publicly available on the Internet;
- a database of policy providers (insurance partners);
- a policy-position pair generator;
- a motor for the generation of insurance proposals, based on machine learning and artificial intelligence algorithms, which will associate the data available in the system with the policies present in the database, possibly building packages of ad hoc products to be signed by means of smart contracts;
- a digital ledger management module distributed via a blockchain which will ensure access to the peer-to-peer network for the secure storage of contractual data;
- a management and control module (dashboard) and an administration module;
- a social media crawling engine that will allow retrieving all publicly available information relating to a customer to increase profiling capacity;
- a module dedicated to customer service;
- an event management module based on location;
- the management of the packaging of policies and micropolicies;
- a Big Data manager;
- an advertising and sponsorship management module;
- an automatic generator of customer profiles which feeds the database, from data from mobile devices and other infrastructure services.

Finally, the back-end component integrates an indelible electronic register (log), stored locally, for the verification and tracking of all the operations performed by the machine administrators (modifications, deletions, additions, tampering) in order to guarantee maximum transparency and fairness towards customers and suppliers.

The advantages offered by the present invention are clear in the light of the above description and will be even clearer from the accompanying figures and the related detailed description.

DESCRIPTION OF THE FIGURES

The invention will hereinafter be described in at least one preferred embodiment thereof by way of non-limiting example with the aid of the accompanying figures, in which:

FIG. 2 shows the complete system with particular emphasis on the back-end infrastructure. The following are illustrated: the mobile devices 400 connected to the IP network 600, load balancers 210, the connection encryption module 211, the queue of requests 212, the server farm 213 to support the infrastructure, the log server 214, the customer database 215, the policy database 216, the blockchain P2P network interface 217, the control dashboard 218, the social media crawler module 219, the Big Data manager 220, the customer support module 221, the advertising entry form 222, the policy-position element generator 223, the user profile generator 224 and the artificial intelligence engine 225

DETAILED DESCRIPTION OF THE INVENTION

The present invention will now be described purely by way of non-limiting or binding example with the aid of the figures, which illustrate some embodiments relative to the present inventive concept.

Figure 1:
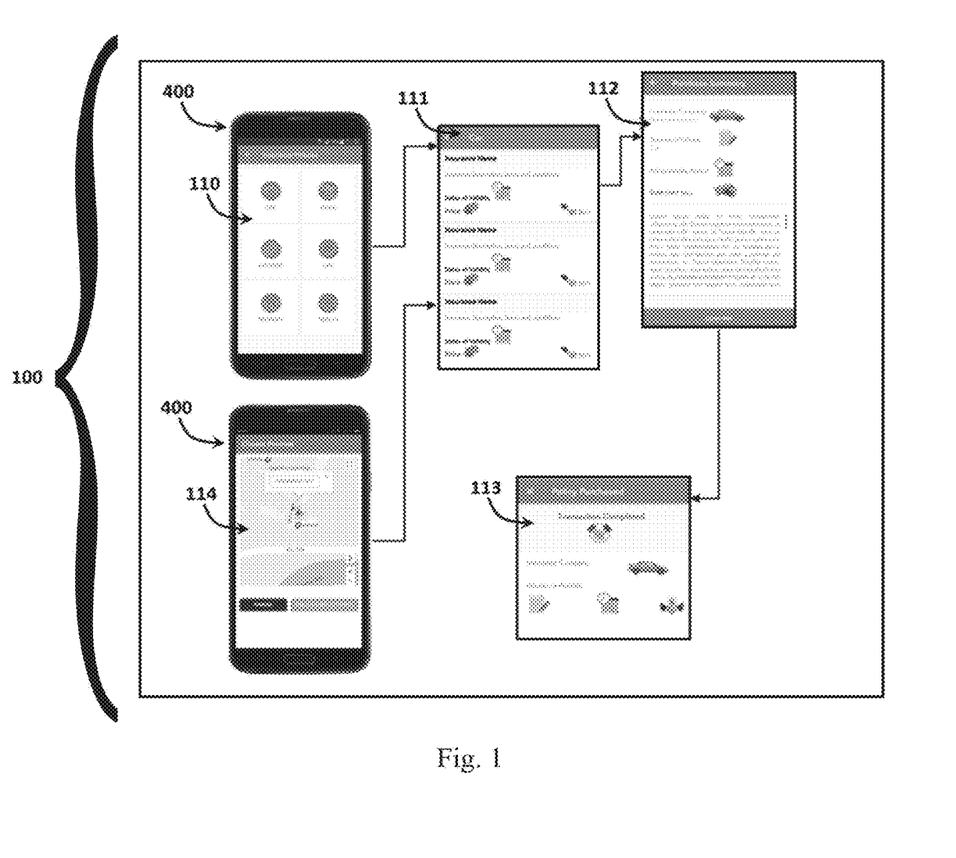
FIG. 1 shows the front-end component 100 which consists of a mobile application to be installed on one or more portable electronic devices 400. The screens that allow the selection of the policy in search mode 110 are enumerated: in particular the category view, the list of insurance companies 111, the detail of the policy 112, the purchase confirmation page 113. Finally, the application screen in automatic proposal mode is shown.
Figure 2:
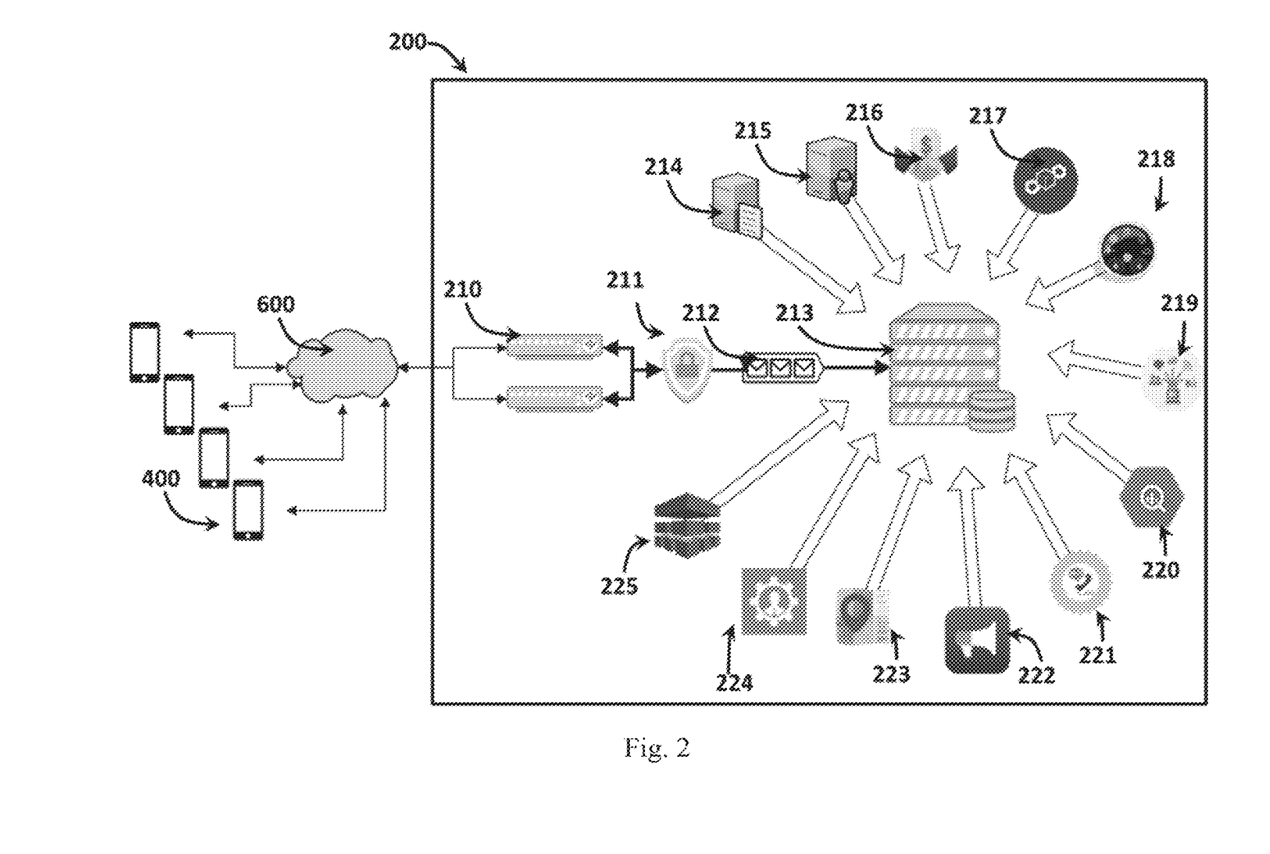

With reference to FIGS. 1 and 2, below is a possible embodiment of the method and system for subscribing insurance policies by means of portable geolocated electronic devices 400.

The system includes a front-end component 100 consisting of a software application to be installed on a smartphone or tablet device, and a back-end infrastructure 200 which provides all the features and services necessary for the subscription and sale of policies. The dialogue between front-end 100 and back-end 200 is guaranteed by the connectivity of the device (mobile data network or Wi-Fi) and takes place using the IP network 600 on a secure channel.

The system uses the potential offered by geolocated devices and the digital channel to allow customers to select the policy that best suits the current needs and context and to finalize the purchase quickly and easily. In the proposed embodiment, in particular, it will be possible to:

- present to the user, directly on their mobile device 400, a plurality of insurance policies, categorized and subdivided by territory;
- use the geo-referencing of the device 400 to identify, through advanced machine learning algorithms 225, the policies best suited to the needs and preferences of the user;
- reserve, dynamically and on the basis of the place and context of reference, special contractual conditions;
- provide the data and documents necessary for the subscription of policies directly from the mobile device 400, at the same time guaranteeing the authenticity and non-falsifiability thereof, using the available hardware (fingerprint readers, cameras, digital signatures, retinal scan, etc.);
- ensure the protection of customer privacy by using cryptographic and hashing algorithms, transmitting only digital signatures (hash) of information and keeping the originals within the system;
- allow the online purchase of policies directly from the mobile application, providing the ability to select the most convenient payment method, including but not limited to: telephone credit, credit and debit cards, bank transfers, forms, digital currency and cryptocurrency. Payments may, by setting in the software, provide for automatic charging at a fixed rate;

implement mechanisms to contrast insurance frauds based on geolocation, sending of photographic evidence and video calls in order to confirm the presence of the insured in the place of the accident or to produce authenticated evidence;

register contracts on distributed databases such as digital registers (distributed ledgers) that use blockchain to ensure the inviolability and the inalterability of the contractual clauses;

exploit the Internet of Things to obtain all the information, not immediately available on the device 400, useful for the formulation of customized offers including, but not limited to: operating conditions of insured vehicles, state of the structures and premises attended, rating of suppliers of services used.

The front-end component 100 will be implemented by means of a special mobile application to be installed on a mobile device 400 provided with:

connectivity to mobile data networks and Wi-Fi;

geolocation capability, by means of satellite detection (GPS, GLONASS, Galileo, etc.), telephone cell identification and Wi-Fi Positioning System protocol;

digital camera, fingerprint reader, NFC technology.

Figure 3:
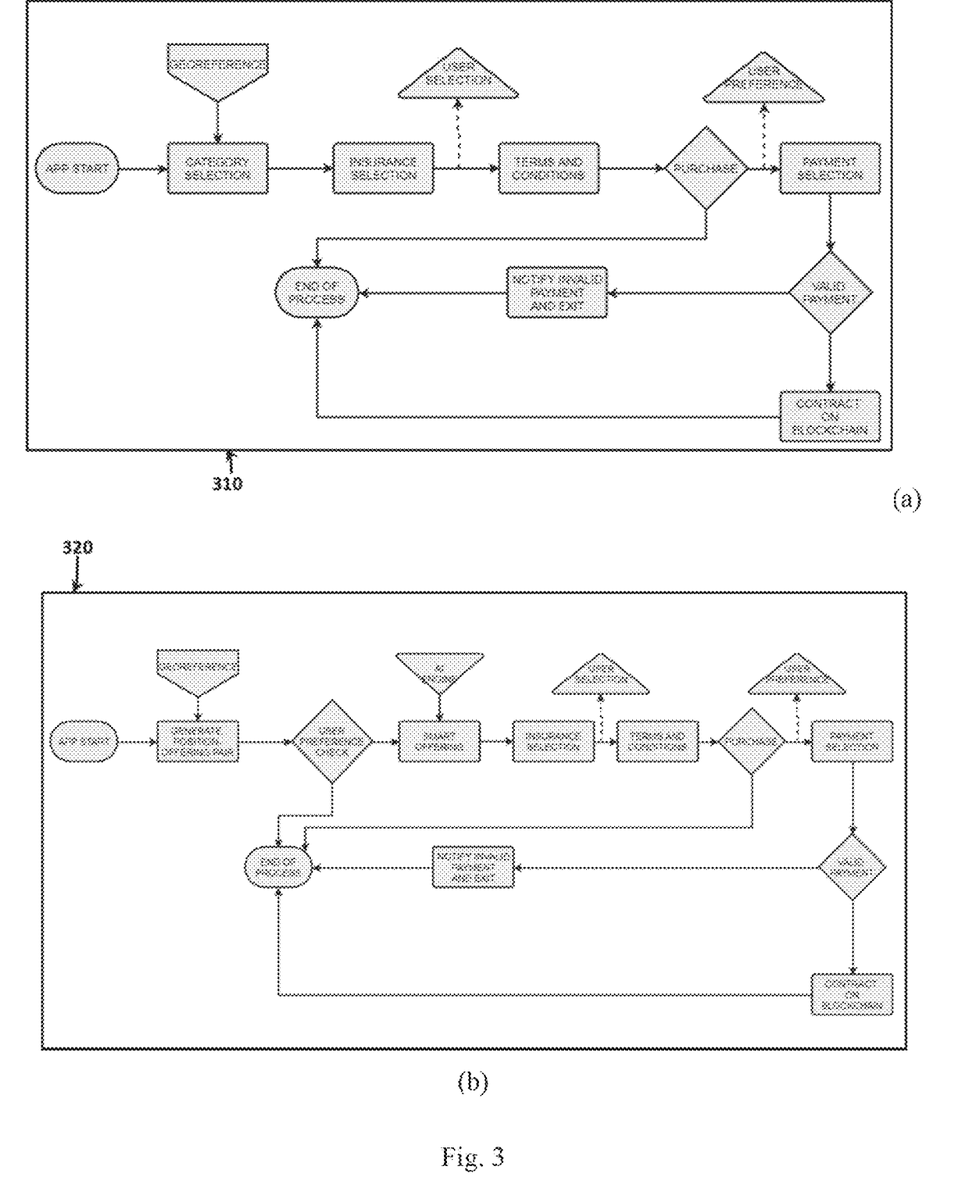
FIG. 3 shows the logical process of subscription of the insurance policy according to the proposed method, both in the search mode 310 and in the automatic proposal mode 320.

The mobile application will be in constant communication with the back-end 200 and has a simple and intuitive user interface based on pictograms (icons) and dynamic contents. The software allows two modes of use: a search mode 110 and an automatic proposal mode 114, selectable from a shortcut menu. In the search mode 110, the list of available policies divided by insurance categories and insurance companies 111 will be displayed. The software will display a new screen for each user's selection, with increasing level of detail, up to the description of the individual policy 112 with costs, duration, terms and conditions, possibly customized according to customer preferences and needs. It will then be possible to proceed with the purchase, by selecting a payment method: the application will manage the transaction autonomously, verifying the successful payment and generating an information package containing all the data necessary for the activation of the policy and the signing of the contract. The information package will then be transmitted to the back-end infrastructure 200 for subsequent entry into a distributed digital ledger that uses blockchain technology 217 to ensure that the data is unalterable. The policy will be activated immediately and the customer will be displayed a confirmation screen 113. In the automatic proposal mode 114 the application will locate the user and show the position on a map, together with a range of proposals automatically generated by the back-end 200 and sent in real time to the device 400 in push mode following georeferencing. The proposals submitted will be identified and, if appropriate, customized based on:

position of the device;

customer preferences and habits;

insurance companies operating in the area.

events in progress in the area;

social media crawling and results of semantic searches on the web;

From the list of policies suggested by the system, the user can make a selection and proceed with the purchase in the manner already described. With reference to FIG. 3 the flowcharts of the operations carried out for the search mode 310 and for the proposal mode 320 are illustrated. In both cases, the front-end module 100 will store the user's choices to send them to the back-end infrastructure 200 in order to enrich the user profile present in the databases 215 and allow the artificial intelligence engine 225 to select the policies to suggest in an increasingly targeted and customer-friendly manner.

In addition to the two methods of use (search and proposal), the front-end 100 will allow the entry and modification of the data necessary for the stipulation of contracts such as:

identification document (digital or scanned and validated);

property documents (real estate, vehicles, equipment, luxury goods);

medical-health certifications;

payment methods.

The entry will be proposed to the user at the first start of the application and can be subsequently integrated according to the needs. The application will then proceed to the validation and encryption of the data entered, which will be kept only within the system, while the information for the signing of contracts will take place by sending a hash of the requested data or tokens corresponding to the information package.

Upon completion of the user interface, the application will provide a configuration page from which the user can modify the usage preferences that include:

default modes of use (search or proposal);

activation and deactivation of automatic charges;

management of the purchase history;

default payment method.

The back-end 200 of the system is implemented through a central infrastructure, consisting of servers 213 alongside distributed services. The infrastructure will be accessible from mobile devices 400, taking advantage of the IP network 600 on a protected channel 211 and is provided with load balancing systems 210 to efficiently address queued requests 212. The central infrastructure 213 will provide the essential services to a classic client-server architecture such as communication protocols, databases, administration and configuration modules, user profiling, content management and distribution systems. The features based on distributed architectures will be implemented by connecting to online services.

The back-end will therefore consist of a series of cooperating functional modules belonging to a central infrastructure 213, listed below:

a user database 215, with profiles, preferences, habits and purchase history;

a database of insurance policies 216, containing references of insurance companies, terms, conditions of applicability, costs and duration;

an automatic generator of customer profiles 224 that will feed the database 215 from data from mobile devices and other infrastructure services.

a generator of policy-position elements 223, processed by crossing the georeferencing data of the customer and the features of the policies present in the database 216 and sorted by distance from the current position;

an engine for the generation of insurance proposals 225, based on machine learning algorithms, which will identify a range of policies, among those present in the database 216, possibly building customized product packages and micropolicies through smart contracts;

a digital ledger management module distributed via blockchain 217 for the safeguard of contractual data;

a dashboard 218 that will allow the monitoring, configuration and administration of the infrastructure 200;

a social media crawling engine 219 that will collect publicly available information from customers to feed the database 215 and increase the efficiency of the policy generation engine 223;

a module dedicated to customer service 221 that will manage online support calls, allowing both customers and suppliers to obtain immediate support for problems concerning the use of the system;

a module that implements the Big Data feature 220, specialized to identify current and future events in a neighborhood of the location of the device 400. The events will then be used by the policy generator 224 to enrich the offer of the proposals;

a module for the management of advertising for sponsors 222;

a log server 214 for tracking and storing operations performed on the infrastructure 200 by administrators (modifications, deletions, additions, tampering).

Finally, it is clear that modifications, additions or variants may be made to the invention described thus far which are obvious to a man skilled in the art, without departing from the scope of protection that is provided by the appended claims.

The invention claimed is:

1. A system for subscribing insurance policies from geo-located mobile devices, comprising:

a front-end component (100), including an application for at least one mobile device (400), said mobile device provided with geolocation, connectivity to data networks and Wi-Fi, a digital camera, a fingerprint reader, and NFC technology; and a back-end infrastructure (200), which provides functionalities and services for subscription and sale of said insurance policies, said front-end component and said back-end infrastructure configured to communicate on a protected channel of an IP network, the front-end component configured i) to prompt a user to perform a selection that selects a policy, as a selected policy, from said insurance policies based on current needs and context, ii) to submit the selected policy based on the selection received by the user, and iii) to finalize a purchase of the selected policy, said application of the front-end component configured to cause the mobile device to implement at least each of:

a search mode, which presents a list of available ones of said insurance policies, an automatic proposal mode, which geolocates and displays on said mobile device one or more insurance proposals that identify a range of policies from said insurance policies, the one or more insurance proposals automatically generated by the back-end infrastructure and sent in push mode to the mobile device, an interface for submission of the selected policy from the selection performed by the user to the back-end infrastructure, for selection of a payment method, and for saving the selected payment method for future uses, an interface for activating automatic charges for payment of insurance premiums, verification of validity of the payment, automatic generation of an information package containing data necessary for activation of the selected policy and signing of a contract to be transmitted to the back-end infrastructure, immediate activation of the selected policy and notification of said immediate activation by means of a confirmation screen, collection of information of choices made by the user during use of the application, and transmission of the collected information to the back-end infrastructure for completing a customer profile, an interface for entering and modifying data necessary for stipulation of contracts, said interface using hardware of the mobile device to authenticate documents necessary for a subscription of the selected policy, and a configuration mode for changing usage preferences, payment preferences, management of purchase history, and activation and deactivation of the automatic charges;

and said back-end infrastructure configured to implement a plurality of functional modules, including:

a user database that stores preferences, habits, and purchase history, a database that stores said insurance policies, an automatic generator of customer profiles including at least data from the information collected by the mobile device, a generator of policy-position elements, processed by crossing georeferencing data of the mobile device and coverage area of the insurance policies stored in the database, a generator of said one or more insurance proposals, where the range of policies identified by the one or more insurance proposals identify, based on machine learning algorithms, ones of the insurance policies stored in the database that correspond to the customer profile, a module that communicates with the mobile device, including at least receiving the selected insurance policy from the mobile device, a dashboard for monitoring, configuration, and administration of the back-end infrastructure, a customer service form for providing user support, a Big Data form for identifying events at a location of the mobile device, a form for sponsor advertisements, and a log server for tracking and storing operations performed on the back-end infrastructure by administrators.

2. The system for subscribing insurance policies according to claim 1, wherein said system is configured to register contracts on distributed databases that use blockchain technology to ensure inviolability and inalterability of the contractual clauses.

3. The system for subscribing insurance policies according to claim 1, wherein said system is configured to use the hardware of the mobile device to implement mechanisms to contrast insurance frauds based on geolocation, sending of photographic evidence and video calls in order to confirm a presence of the user in a place of an accident, or to produce authenticated evidence.

4. The system for subscribing insurance policies according to claim 1, wherein said system is configured to use cryptographic and hashing algorithms of sensitive data to ensure protection of customer privacy, said sensitive data being stored only within the system and being transmitted, when requested, as digital signatures or as tokens to be traced back to an information package, said information being verifiable by an insurance company without requiring access to the sensitive data.

5. The system for subscribing insurance policies according to claim 1, wherein said back-end infrastructure produces packages of customized products and micro-policies.

6. The system for subscribing insurance policies according to claim 1, wherein said system is configured to use the hardware of the mobile device to start video calls with operators or personnel.

7. The system for subscribing insurance policies according to claim 1, wherein said back-end infrastructure includes a social media crawler module that obtains customer information from the Internet, and adds said customer information to a customer database for increasing an accuracy of the generator of the insurance proposals based on said machine learning algorithms.

8. The system for subscribing insurance policies according to claim 2, wherein said system is configured to use the hardware of the mobile device to implement mechanisms to contrast insurance frauds based on geolocation, sending of photographic evidence and video calls in order to confirm a presence of the user in a place of an accident, or to produce authenticated evidence.

9. The system for subscribing insurance policies according to claim 2, wherein said back-end infrastructure produces packages of customized products and micro-policies.

10. The system for subscribing insurance policies according to claim 3, wherein said back-end infrastructure produces packages of customized products and micro-policies.

11. The system for subscribing insurance policies according to claim 4, wherein said back-end infrastructure produces packages of customized products and micro-policies.

12. The system for subscribing insurance policies according to claim 2, wherein said system is configured to use the hardware of the mobile device to start video calls with operators or personnel.

13. The system for subscribing insurance policies according to claim 3, wherein said system is configured to use the hardware of the mobile device to start video calls with operators or personnel.

14. The system for subscribing insurance policies according to claim 4, wherein said system is configured to use the hardware of the mobile device to start video calls with operators or personnel.

* * * * *